(12) United States Patent
Sasabata

(10) Patent No.: US 7,120,202 B2
(45) Date of Patent: Oct. 10, 2006

(54) WIRELESS COMMUNICATION APPARATUS

(75) Inventor: Akihiro Sasabata, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 691 days.

(21) Appl. No.: 10/275,112

(22) PCT Filed: Mar. 14, 2002

(86) PCT No.: PCT/IB02/02502

§ 371 (c)(1),
(2), (4) Date: Nov. 1, 2002

(87) PCT Pub. No.: WO02/080478

PCT Pub. Date: Oct. 10, 2002

(65) Prior Publication Data

US 2003/0147475 A1    Aug. 7, 2003

(51) Int. Cl.
| | |
|---|---|
| *H03C 1/52* | (2006.01) |
| *H04L 27/02* | (2006.01) |
| *H04L 27/04* | (2006.01) |
| *H04L 27/20* | (2006.01) |
| *H04B 7/165* | (2006.01) |

(52) U.S. Cl. .................. 375/271; 375/302; 375/300; 375/322; 375/320; 455/17; 455/23; 455/102; 455/108; 455/110

(58) Field of Classification Search .............. None
See application file for complete search history.

(56) References Cited

U.S. PATENT DOCUMENTS 5,815,531 A    9/1998   Dent 5,862,465 A *  1/1999   Ou ............................ 455/234.1
5,940,365 A *  8/1999   Takegahara et al. ......... 370/208
6,452,909 B1 * 9/2002   Bauer .......................... 370/280

(Continued)

FOREIGN PATENT DOCUMENTS

EP    1 056 248    11/2000

(Continued)

OTHER PUBLICATIONS

Japanese office action issued Nov. 25, 2003 (w/ English translation of relevant portion).
International Search Report mailed Mar. 5, 2003.

*Primary Examiner*—Dac Ha
*Assistant Examiner*—Linda Wong
(74) *Attorney, Agent, or Firm*—Dickstein Shapiro LLP

(57) ABSTRACT

In a wireless communication apparatus which has the functions of both ASK modulation and QPSK modulation, which can be manufactured at a low cost, and which is small in size, an output terminal of a QPSK modulator is connected to a carrier wave input terminal of an ASK modulator via a switch. Also, an antenna is connected to an output terminal of the ASK modulator via a switch. Furthermore, a mixer is provided between the switches and. The switch connects the QPSK modulator and the ASK modulator at the time of a transmission, whereas it connects the QPSK modulator and the mixer at the time of a reception. The switch connects the ASK modulator and the antenna at the time of a transmission, whereas it connects the antenna and the mixer at the time of a reception. Thus, at the time of a transmission, an ASK-modulated wave or a QPSK-modulated wave is output using the ASK modulator and the QPSK modulator. At the time of a reception, a sine wave is output by the QPSK modulator and a data signal is down-converted, detected, or demodulated by the mixer.

14 Claims, 9 Drawing Sheets

U.S. PATENT DOCUMENTS

| | | | |
|---|---|---|---|
| 6,567,394 B1 * | 5/2003 | Arisawa | 370/343 |
| 6,647,250 B1 * | 11/2003 | Bultman et al. | 455/102 |
| RE39,111 E * | 5/2006 | Oshima | 386/46 |
| 2002/0019239 A1 * | 2/2002 | Kasapidis | 455/456 |
| 2003/0002593 A1 * | 1/2003 | Galins | 375/298 |

FOREIGN PATENT DOCUMENTS

| | | |
|---|---|---|
| GB | 2 349 526 | 11/2000 |
| JP | 60-25354 | 2/1985 |
| JP | 2000-196690 | 7/2000 |
| WO | WO 02/080478 | 10/2002 |

* cited by examiner

WIRELESS COMMUNICATION APPARATUS

CROSS REFERENCE TO RELATED APPLICATIONS

This application is based upon PCT International Application No. PCT/IB02/02502, filed Mar. 14, 2002, claiming priority of Japanese Application No. 2001-076883, filed Mar. 16, 2001.

FIELD OF THE INVENTION

The present invention relates to wireless communication apparatuses for digital wireless communications, and particularly to a wireless communication apparatus which has functions of both amplitude modulation (Amplitude Shift Keying: hereinafter referred to as ASK modulation) and quadrature phase modulation (Quadrature Phase Shift Keying: hereinafter referred to as QPSK modulation).

BACKGROUND OF THE INVENTION

Generally, in wireless communication apparatuses, various modulation methods are used, such as ASK modulation in which the amplitude of a carrier wave is modulated in accordance with an ASK data signal, and QPSK modulation in which the phase of a carrier wave is modulated into four phases using an I-signal (in-phase signal) and a Q-signal (quadrature signal) in accordance with a QPSK data signal.

In a known wireless communication apparatus, modulators in accordance with both of the modulation methods, such as an ASK modulator and a QPSK modulator, are attached, and each modulator, together with a high-frequency signal source for supplying a carrier wave, a mixer for mixing a reception wave and a carrier wave for receiver detection, etc., constitutes an RF unit for handling high-frequency signals.

In the wireless communication apparatus according to the related art described above, in order to allow both ASK modulation and QPSK modulation, two RF units must be provided in the single wireless communication apparatus in accordance with the two modulation methods, respectively.

That is, an RF unit for ASK modulation and an RF unit for QPSK modulation must be separately provided, which incurs a higher manufacturing cost compared with a wireless communication apparatus having only one of the modulation functions. In particular, if the high-frequency signal source, the mixer, etc. are implemented using expensive ICs composed of GaAs, etc., the manufacturing cost is considerably raised. In addition, because two RF units are provided, the RF units have a larger footprint and occupy a larger space, increasing the overall size of the wireless communication apparatus.

Addressing these concerns, the present invention provides a wireless communication apparatus which is capable of both ASK modulation and QPSK modulation, which can be manufactured at a low cost, and which is small in size.

SUMMARY OF THE INVENTION

The present invention provides a wireless communication apparatus including an ASK modulator for ASK-modulating a carrier wave using a data signal; and a QPSK modulator for QPSK-modulating a carrier wave using an I-signal and a Q-signal; wherein an output terminal of the QPSK modulator is connected to a carrier wave input terminal of the ASK modulator. Accordingly, both a QPSK-modulated wave and an ASK-modulated wave can be output without having to connect separate high-frequency signal sources respectively to the ASK modulator and the QPSK modulator as in the related art. That is, it suffices to connect a high-frequency signal source only to the QPSK modulator. Thus, the number of components is reduced, serving to lower the manufacturing cost and to reduce the overall size of apparatus.

The wireless communication apparatus according to the present invention may further include a mixer; and a switch provided between the QPSK modulator and each of the mixer and the ASK modulator, the switch connecting the ASK modulator and the QPSK modulator at the time of a transmission, and connecting the mixer and the QPSK modulator at the time of a reception; wherein the QPSK modulator outputs a sine wave for serving as a carrier wave at the time of a reception. Accordingly, at the time of a transmission, the switch connects the ASK modulator and the QPSK modulator, so that an ASK-modulated wave or a QPSK-modulated wave can be output. At the time of a reception, the switch connects the mixer and the QPSK modulator, and the QPSK modulator outputs a sine wave, so that the mixer mixes a reception wave and the sine wave, so that the reception wave is demodulated into a data signal.

In the wireless communication apparatus according to the present invention, the arrangement may be such that when outputting a QPSK-modulated wave at the time of a transmission, the QPSK modulator QPSK-modulates a carrier wave using an I-signal and a Q-signal to output a QPSK-modulated wave, and the ASK modulator amplifies the QPSK-modulated wave by a constant gain; that is, a QPSK modulated wave can be output using the ASK modulator as an amplifier.

The arrangement may also be such that when outputting an ASK-modulated wave at the time of a transmission, the QPSK modulator outputs a sine wave, and the ASK modulator ASK-modulates the sine wave using a data signal; that is, an ASK-modulated wave can be output using the QPSK modulator as a high-frequency signal source.

In the wireless communication apparatus according to the present invention, the arrangement may be such that when outputting a QPSK-modulated wave at the time of a transmission, the QPSK modulator receives input of data signals respectively as an I-signal and a Q-signal and outputs a QPSK-modulated wave, and the ASK modulator receives an input signal having a constant voltage as a data signal and amplifies the QPSK-modulated wave by a constant gain.

In the wireless communication apparatus according to the present invention, the arrangement may be such that when outputting an ASK-modulated wave at the time of a transmission, the QPSK modulator receives input of signals having the same fixed phase difference and fixed amplitudes respectively as an I-signal and a Q-signal and outputs a sine wave, and the ASK modulator receives input of a data signal and ASK-modulates the sine wave to output an ASK-modulated wave.

In the wireless communication apparatus according to the present invention, the arrangement may be such that when outputting an ASK-modulated wave at the time of a transmission, the QPSK modulator receives input of signals based on a QPSK data signal "00" as an I-signal and a Q-signal and performs a π/4 shift QPSK operation to output a sine wave, and the ASK modulator receives input of a data signal and ASK-modulates the sine wave to output an ASK-modulated wave.

In the wireless communication apparatus according to the present invention, the arrangement may be such that the QPSK modulator receives an input carrier wave having a frequency which is lower than a predetermined frequency by a transmission rate/4·Hz and performs a π/4 shift QPSK operation to output a sine wave having the predetermined frequency. Accordingly, even if the frequency of an output signal is raised by the transmission rate/4·Hz relative to the frequency of the carrier wave due to a π/4 shift QPSK operation of the QPSK modulator, the QPSK modulator outputs a sine wave having the predetermined frequency.

In the wireless communication apparatus according to the present invention, the arrangement may be such that when outputting a QPSK-modulated wave at the time of a transmission, the QPSK modulator QPSK-modulates a carrier wave using an I-signal and a Q-signal to output a QPSK-modulated wave, and the ASK modulator amplifies the QPSK-modulated wave by a constant gain, whereas when outputting an ASK-modulated wave at the time of a transmission, the QPSK modulator receives input of data signals having the same fixed phase difference, and amplitudes thereof changing identically in time respectively as an I-signal and a Q-signal, and outputs an ASK-modulated wave, and the ASK modulator receives an input signal having a constant voltage as a data signal and amplifies the ASK-modulated wave by a constant gain. Accordingly, an ASK-modulated wave can be output even if the ASK modulator does not operate normally.

The wireless communication apparatus according to the present invention may further include an up-mixer for raising frequency, connected between the ASK modulator and the QPSK modulator. Accordingly, even if, for example, a high frequency is used for communications, it suffices for the QPSK modulator to output a low-frequency signal. Thus, compared with a case where a high-frequency signal is output directly by the QPSK modulator, the QPSK modulator can be readily manufactured using inexpensive materials.

Furthermore, in the wireless communication apparatus according to the present invention, the ASK modulator, the mixer, and the switch may be integrated as an RF block. Accordingly, the RF block can be readily used in a communication apparatus which is capable of both ASK modulation and QPSK modulation, such as the one according to the present invention, and can also be used in a communication apparatus which requires only ASK modulation function. Thus, the RF blocks can be manufactured in a large quantity, serving to lower manufacturing cost.

DETAILED DESCRIPTION OF EMBODIMENTS OF THE INVENTION

Figure 1:
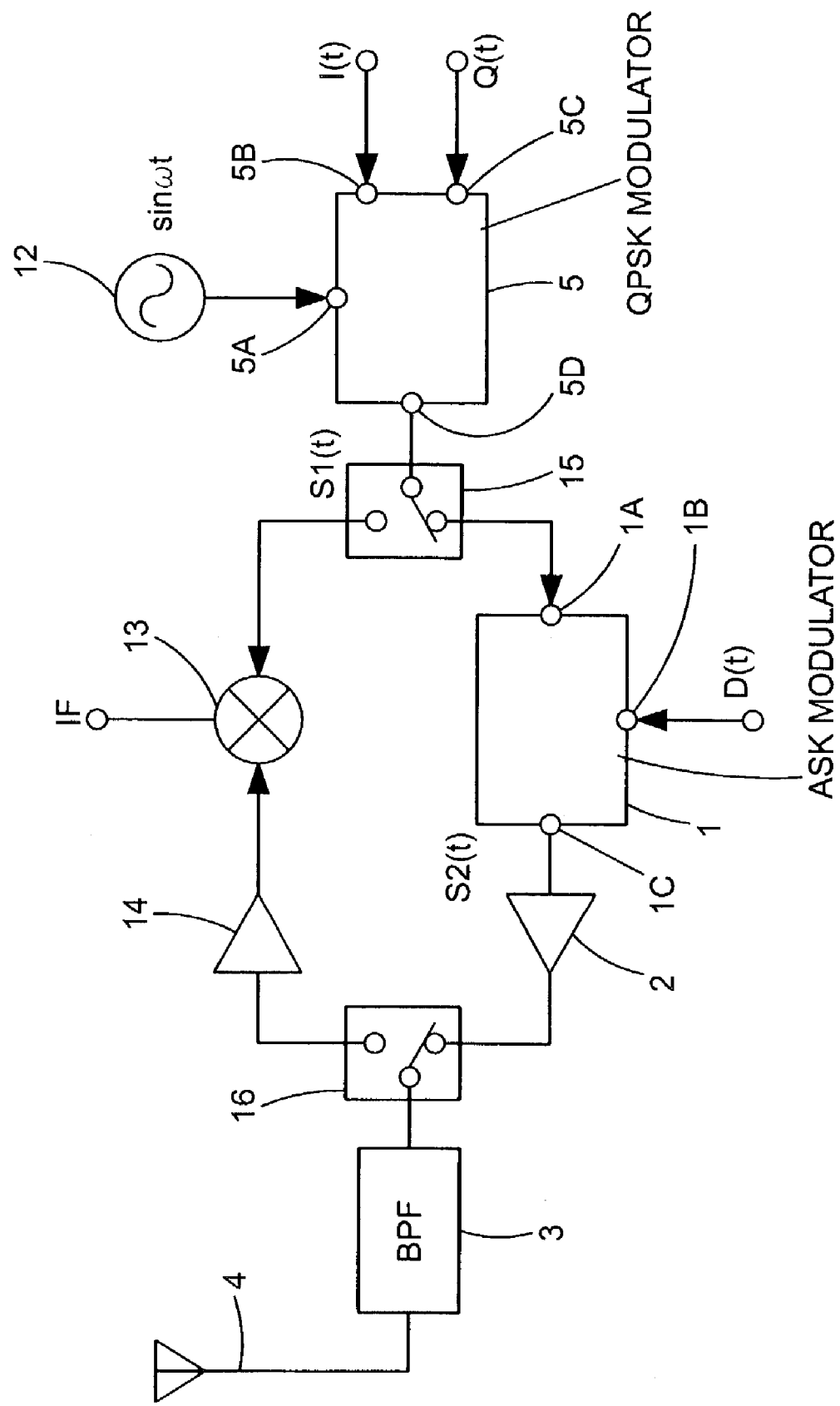
FIG. 1 is an overall block diagram of a wireless communication apparatus according to a first embodiment of the present invention.

Wireless communication apparatuses according to several embodiments of the present invention will now be described in detail with reference to the accompanying drawings.

First Embodiment

FIGS. 1 to 5 show a wireless communication apparatus according to a first embodiment. Referring to FIGS. 1 to 5, an ASK modulator 1 has a carrier wave input terminal 1A to which a carrier wave is input, and a data input terminal 1B to which a digital data signal D(t) is input. The ASK modulator 1 amplitude-modulates (ASK-modulates) the carrier wave input to the carrier wave input terminal 1A based on the data signal D(t) input to the data input terminal 1B, outputting an ASK-modulated wave from an output terminal 1C.

Furthermore, a QPSK modulator 5 is connected to the carrier wave input terminal 1A of the ASK modulator 1 via a switch 15 to be described later. Furthermore, an amplifier 2 is connected to the output terminal 1C of the ASK modulator 1. To the output of the amplifier 2, a bandpass filter 3 and an antenna 4 are connected via a switch 16 to be described later.

The QPSK modulator 5 has a carrier wave input terminal 5A to which a carrier wave is input, an I-signal input terminal 5B and a Q-signal input terminal 5C to which an I-signal I(t) (in-phase signal) and a Q-signal Q(t) (quadrature signal) in accordance with a QPSK data signal are respectively input, and an output terminal 5D from which an output signal S1(t) in the form of a QPSK-modulated wave, etc. is output.

Figure 2:
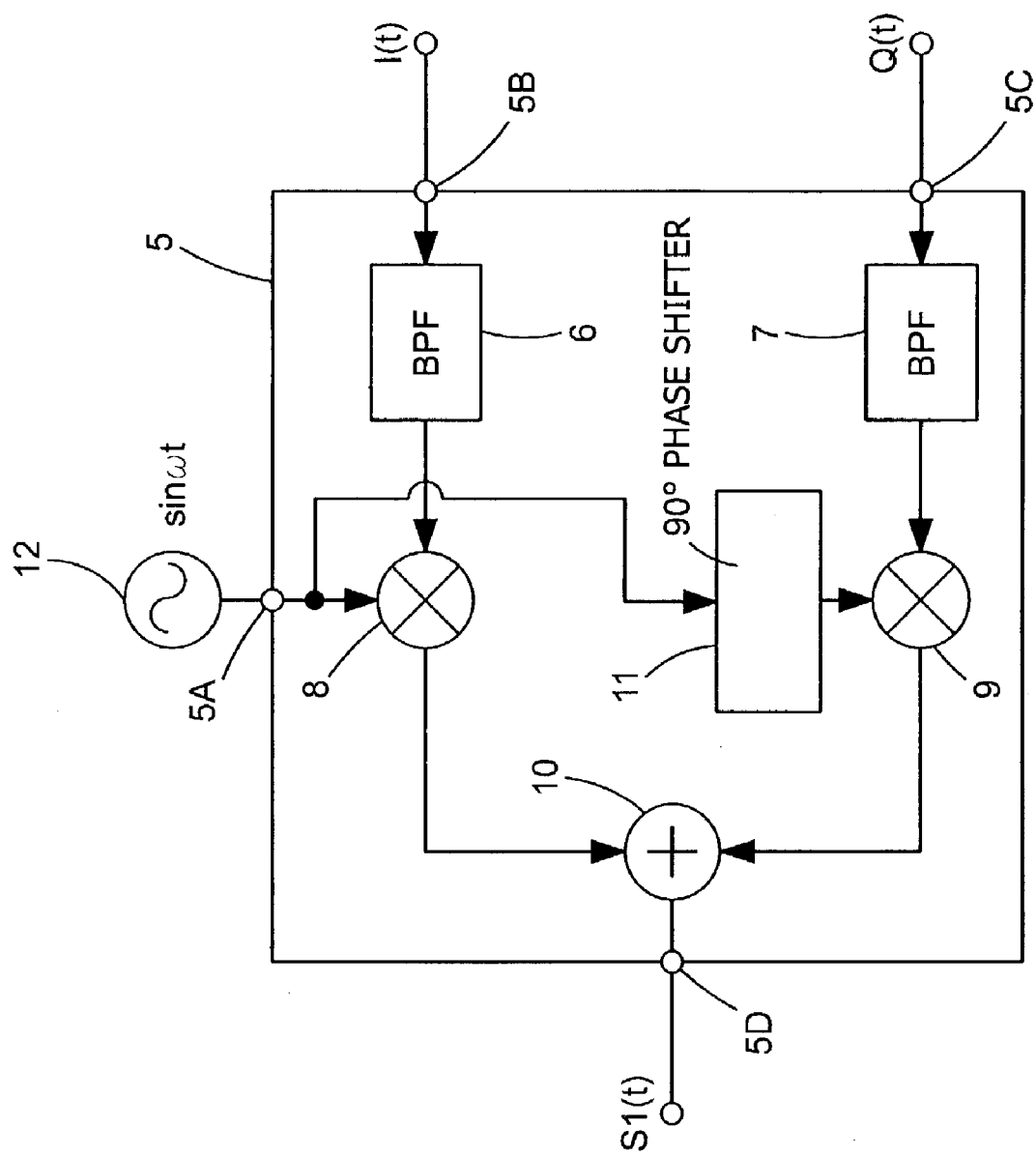
FIG. 2 is a block diagram of a QPSK modulator shown in FIG. 1.

Furthermore, as shown in FIG. 2, the QPSK modulator 5 includes bandpass filters 6 and 7 connected respectively to the I-signal input terminal 5B and the Q-signal input terminal 5C, mixers 8 and 9 connected respectively to the outputs of the bandpass filters 6 and 7, and an adder 10 for adding signals output from the mixers 8 and 9.

The mixer 8 associated with the I-signal input terminal 5B is directly connected to the carrier wave input terminal 5A, whereas the mixer 9 associated with the Q-signal input terminal 5C is indirectly connected to the carrier wave input terminal 5A via a 90° phase shifter 11. The carrier wave input terminal 5A of the QPSK modulator 5 is connected to a high-frequency signal source 12 to be described later. Thus, a sine wave (sin ωt) is input to the mixer 8 from the high-frequency signal source 12 to be described later, and a cosine wave (cos ωt) is input to the mixer 9. Furthermore, the output terminal 5D is allowed to be selectively connected to the ASK modulator 1 or a mixer 13 via the switch 15 to be described later.

The high-frequency signal source 12 is connected to the carrier wave input terminal 5A of the QPSK modulator 5, as shown in FIG. 1. The high-frequency signal source 12 outputs a sine wave (sin ωt) having a frequency on the order of, for example, 1 to 10 GHz.

The mixer 13 is a mixer for reception, and it has a reception wave input terminal (not shown) which is connected to the antenna 4 via an amplifier 14, the switch 16, and the bandpass filter 3. The mixer 13 also has a carrier wave input terminal (not shown) which is connected to the output terminal 5D of the QPSK modulator 5 via the switch 15. The mixer 13 mixes a reception wave input from the antenna 4 and a sine wave input from the QPSK modulator 5 as a carrier wave, detecting or demodulating an ASK data signal, etc. to output an IF signal.

The switches 15 and 16 are switched for transmission and reception. The switches 15 and 16 connect the ASK modulator 1 between the QPSK modulator 5 and the antenna 4 at the time of a transmission, whereas they connect the mixer 13 between the QPSK modulator 5 and the antenna 4 at the time of a reception.

The operation of the wireless communication apparatus according to the first embodiment will now be described with reference to FIGS. 1 to 5.

Figure 3:
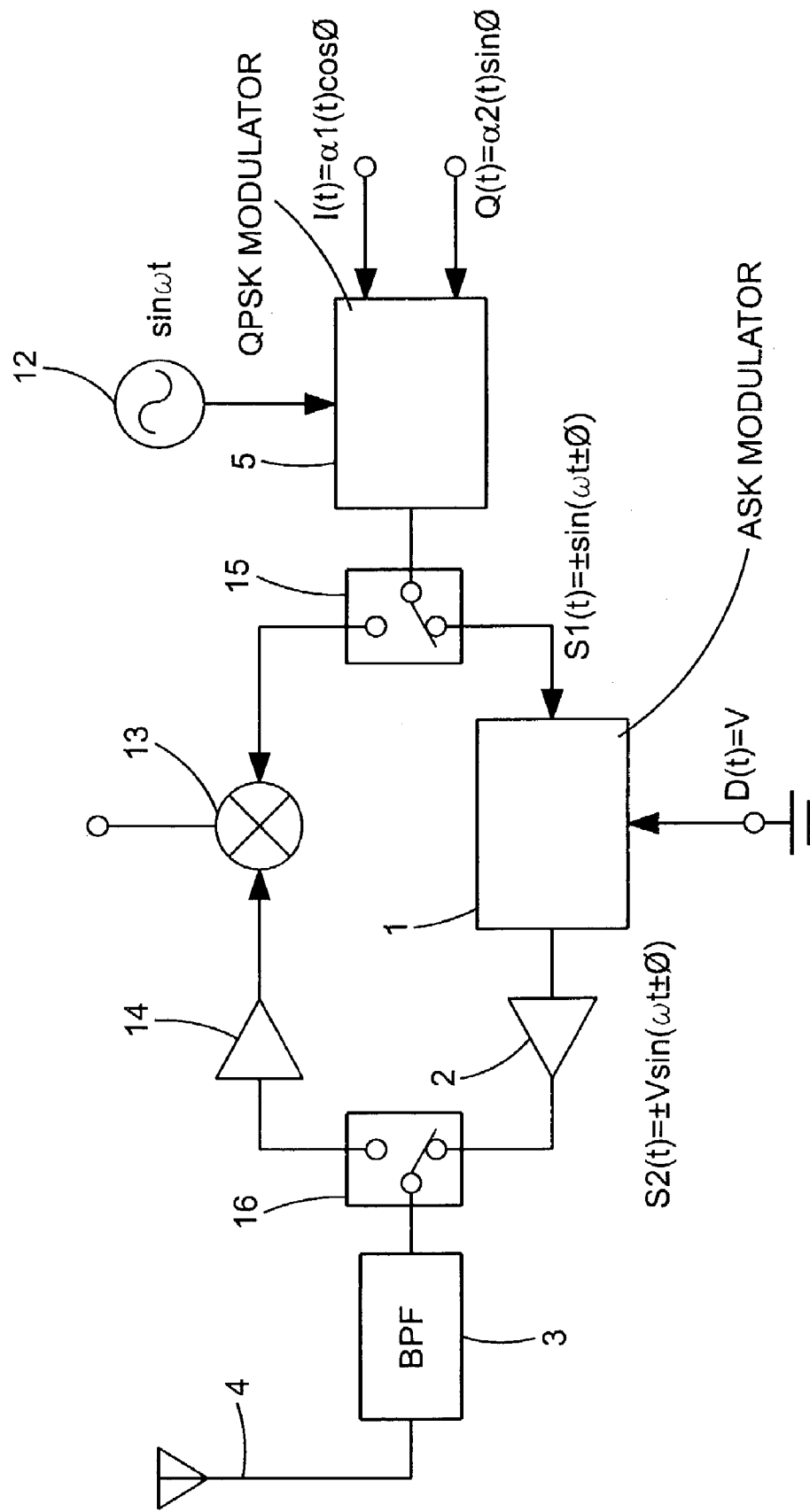
FIG. 3 is a block diagram showing the wireless communication apparatus according to the first embodiment in a state for outputting a QPSK-modulated wave at the time of a transmission.

As shown in FIG. 3, when outputting a QPSK-modulated wave at the time of a transmission, the switches 15 and 16 connect the QPSK modulator 5 to the ASK modulator 1 and also connect the ASK modulator 1 to the antenna 4.

In this state, a carrier wave output from the high-frequency signal source 12 is input to the carrier wave input terminal of the QPSK modulator 5, and an I-signal I(t) and a Q-signal Q(t) based on four digital codes (00, 01, 10, and 11) or four symbols of a QPSK data signal as expressed by equations (1) below are input respectively to the I-signal input terminal and the Q-signal input terminal.

$$I(t) = \alpha 1(t) \cos \phi$$

$$Q(t) = \alpha 2(t) \sin \phi \quad (1)$$

$\alpha 1(t)$ and $\alpha 2(t)$ are set to 1 or −1 in accordance with each of the symbols of QPSK data signal ($\alpha 1(t), \alpha 2(t) \in \{1, -1\}$). The phase $\phi$ is set to a fixed value on the order of, for example, 45° ($\pi/4$ [rad]).

The QPSK modulator 5 mixes each of the I-signal I(t) and the Q-signal Q(t) with the carrier wave (sin ωt) from the high-frequency signal source 12 (see FIG. 2) and adds the results, outputting an output signal S1(t) expressed by equation (2) below:

$$S1(t) = I(t)\sin \omega t + Q(t)\cos \omega t = \alpha 1(t)\cos \phi \sin \omega t + \alpha 2(t) \sin \phi \cos \omega t = \pm \sin(\omega t \pm \phi) \quad (2)$$

The output signal S1(t) is thus switched among four phases with phase shifts of 45°, 135°, 225°, and 315° relative to the carrier wave, corresponding to the four symbols of the QPSK data signal. That is, the QPSK modulator 5 outputs the output signal S1(t) in the form of a QPSK-modulated wave ($\pm \sin(\omega t \pm \phi)$).

At this time, a constant voltage V is input to the data input terminal 1B of the ASK modulator 1 as a data signal D(t). Thus, the ASK modulator 1 amplifies the output signal S1(t) output from the QPSK modulator 5 by a constant gain. That is, the ASK modulator 1 amplifies the QPSK-modulated wave ($\pm \sin(\omega t \pm \phi)$) to output an output signal S2(t) expressed by equation (3) below:

$$S2(t) = D(t)S1(t) = \pm V \sin(\omega t \pm \phi) \quad (3)$$

Figure 4:
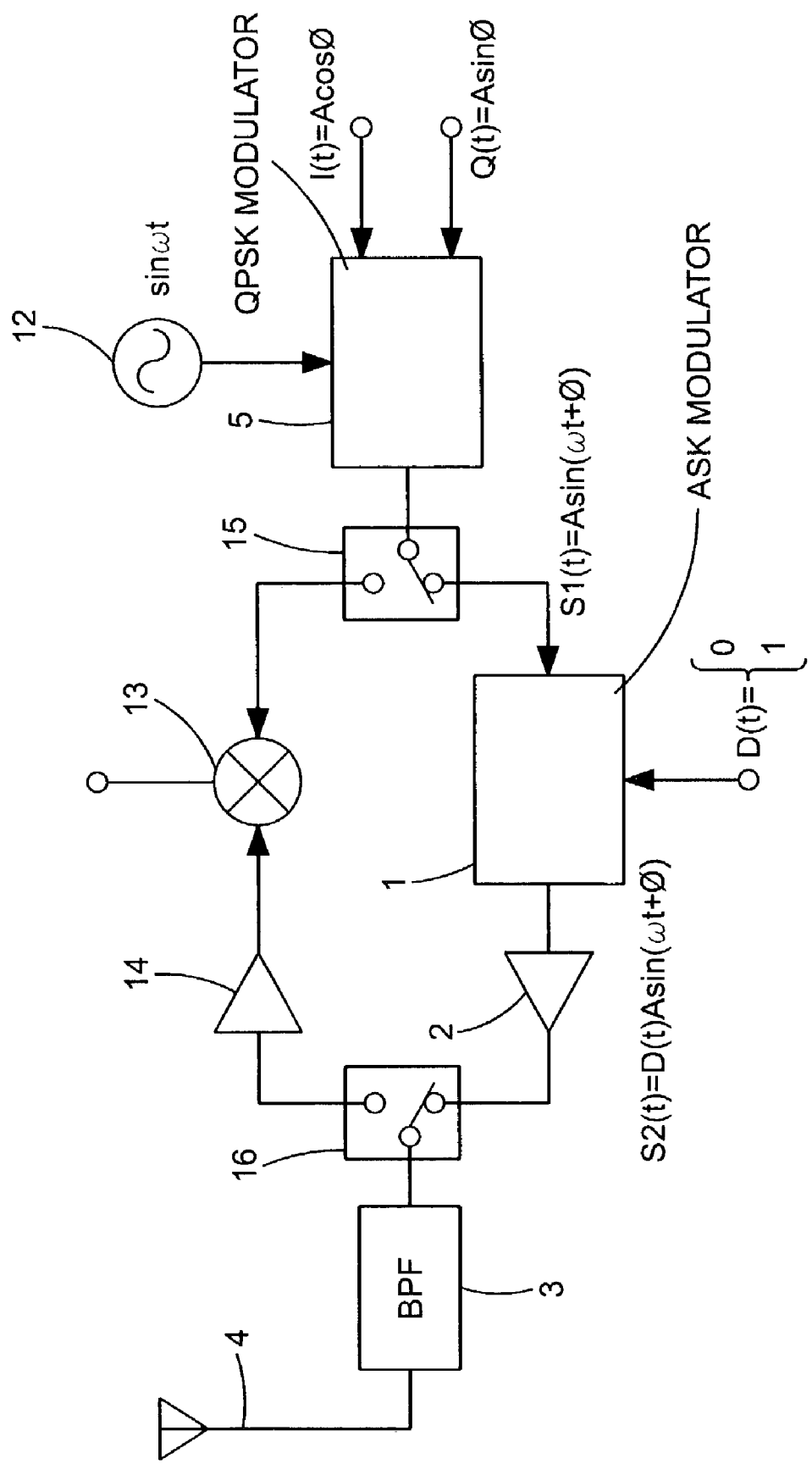
FIG. 4 is a block diagram showing the wireless communication apparatus according to the first embodiment in a state for outputting an ASK-modulated wave at the time of a transmission.

As shown in FIG. 4, when outputting an ASK-modulated wave at the time of a transmission, the switches 15 and 16 connect the QPSK modulator 5 to the ASK modulator 1 and also connect the ASK modulator 1 to the antenna 4, similarly to FIG. 3.

In this state, a carrier wave (sin ωt) output from the high-frequency signal source 12 is input to the carrier wave input terminal of the QPSK modulator 5, and an I-signal I(t) and a Q-signal Q(t) expressed by equations (4) below are input respectively to the I-signal input terminal and the Q-signal input terminal. The phases of the I-signal I(t) and the Q-signal Q(t) are set to the same fixed value $\phi$, for example, 45° ($\pi/4$ [rad]), and the amplitudes thereof are also set to the same fixed value A.

$$I(t) = A \cos \phi$$

$$Q(t) = A \sin \phi \quad (4)$$

The QPSK modulator 5 mixes each of the I-signal I(t) and the Q-signal Q(t) with the carrier wave (sin ωt) from the high-frequency signal source 12 and adds the results, outputting an output signal S1(t) expressed by equation (5) below. That is, the QPSK modulator 5 outputs the output signal S1(t) in the form of a sine wave (A sin(ωt+$\phi$)).

$$S1(t) = I(t)\sin \omega t + Q(t)\cos \omega t$$
$$= A \cos \phi \sin \omega t + A \sin \phi \cos \omega t$$
$$= A \sin(\omega t + \phi) \quad (5)$$

At this time, a discretized ASK data signal D(t)∈{0, 1} is input to the data input terminal of the ASK modulator 1 as a data signal D(t). Thus, the ASK modulator 1 ASK-modulates the output signal S1(t) in the form of the sine wave output from the QPSK modulator 5 using the data signal D(t). That is, the ASK modulator 1 outputs an output signal S2(t) in the form of an ASK modulated wave (D(t)A sin((ωt+$\phi$))) as expressed by equation (6) below:

$$S2(t) = D(t)S1(t)$$
$$= D(t)A\sin(\omega t + \phi) \quad (6)$$

Figure 5:
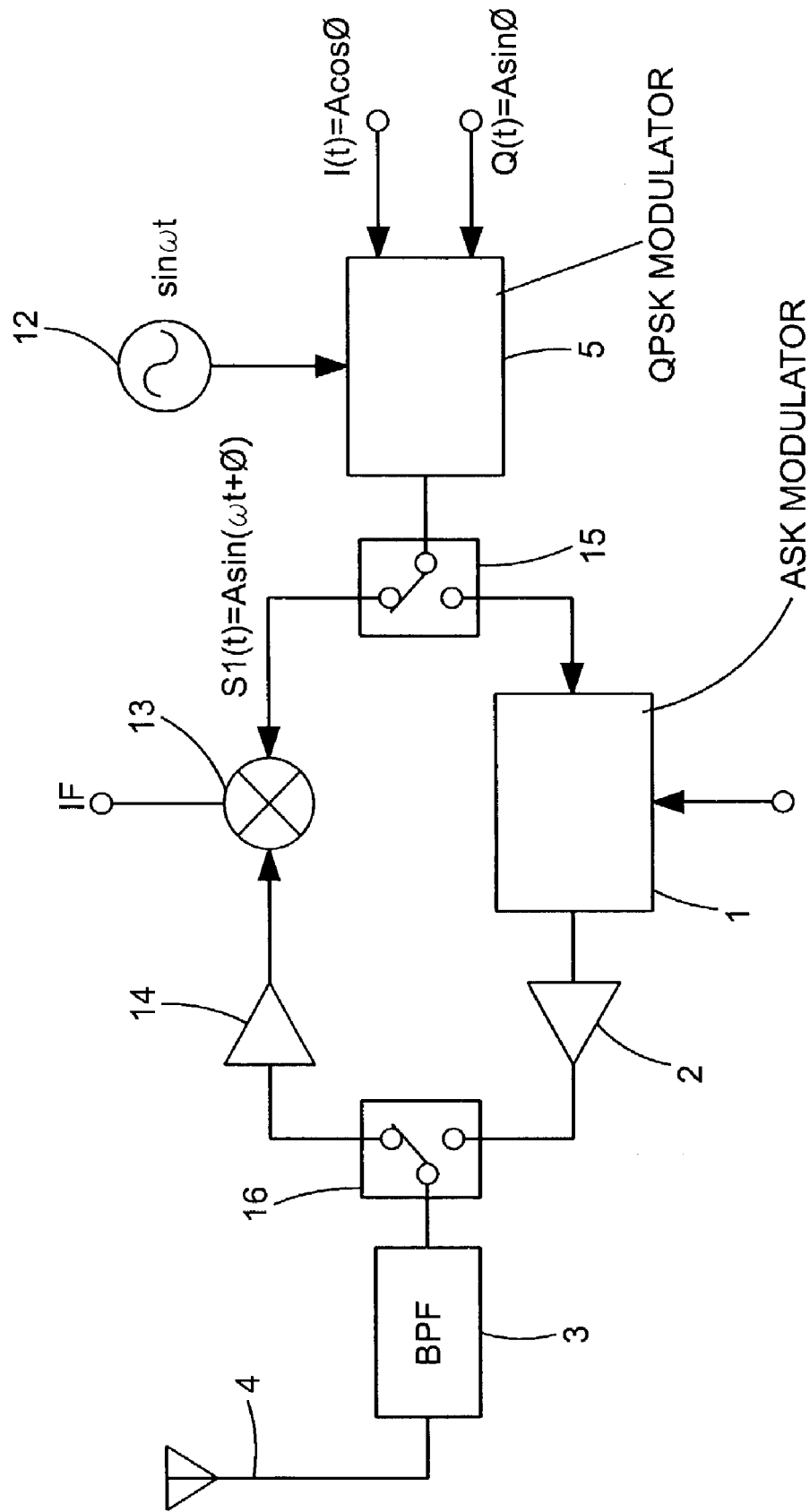
FIG. 5 is a block diagram showing the wireless communication apparatus according to the first embodiment at the time of a reception.

As shown in FIG. 5, at the time of a reception, the switches 15 and 16 connect the QPSK modulator 5 to the mixer 13 and also connect the mixer 13 to the antenna 4.

In this state, a carrier wave (sin ωt) output from the high-frequency signal source 12 is input to the carrier wave input terminal of the QPSK modulator 5. Furthermore, an I-signal I(t) and a Q-signal Q(t), the phases thereof being set to the same fixed value $\phi$, for example, 45° ($\pi/4$ [rad]) and the amplitudes thereof being set to the same fixed value A, are input respectively to the I-signal input terminal and the Q-signal input terminal. Thus, similarly to the case of outputting an ASK-modulated wave, the QPSK modulator 5 outputs an output signal S1(t) in the form of a sine wave (sin(ωt+$\phi$)).

Then, the mixer 13 mixes a reception wave received by the antenna 4 and the output signal S1(t) output from the QPSK modulator 5, thereby down-converting the reception wave into a data signal IF.

As described above, according to the first embodiment, the output terminal 5D of the QPSK modulator 5 is connected to the carrier wave input terminal 1A of the ASK modulator 1. Thus, when outputting a QPSK-modulated wave, the QPSK modulator 5 outputs a QPSK-modulated wave, and the ASK modulator 1 amplifies the QPSK-modulated wave by a constant gain for output.

On the other hand, when outputting an ASK-modulated wave, the QPSK modulator 5 outputs a sine wave, and the ASK modulator 1 ASK-modulates the sine wave using a data signal D(t), whereby an ASK-modulated wave is output.

Thus, according to the first embodiment, in contrast to the related art, separate high-frequency signal sources need not be connected respectively to the ASK modulator 1 and the QPSK modulator 5. That is, it suffices only to connect the high-frequency signal source 12 to the QPSK modulator 5. Thus, the number of parts is reduced, serving to lower manufacturing cost and to reduce the size of wireless communication apparatus.

The switch 15 provided between the QPSK modulator 5 and each of the mixer 13 and the ASK modulator 1 connects the ASK modulator 1 and the QPSK modulator 5 at the time of a transmission, whereas it connects the mixer 13 and the QPSK modulator 5 at the time of a reception. Furthermore, the QPSK modulator 5 outputs a sine wave at the time of a reception. Accordingly, the mixer 13 mixes a reception wave received by the antenna 4 and an output signal S1(t) output from the QPSK modulator 5, thereby detecting, demodulating, or down-converting the reception wave into a data signal.

Second Embodiment

Figure 6:
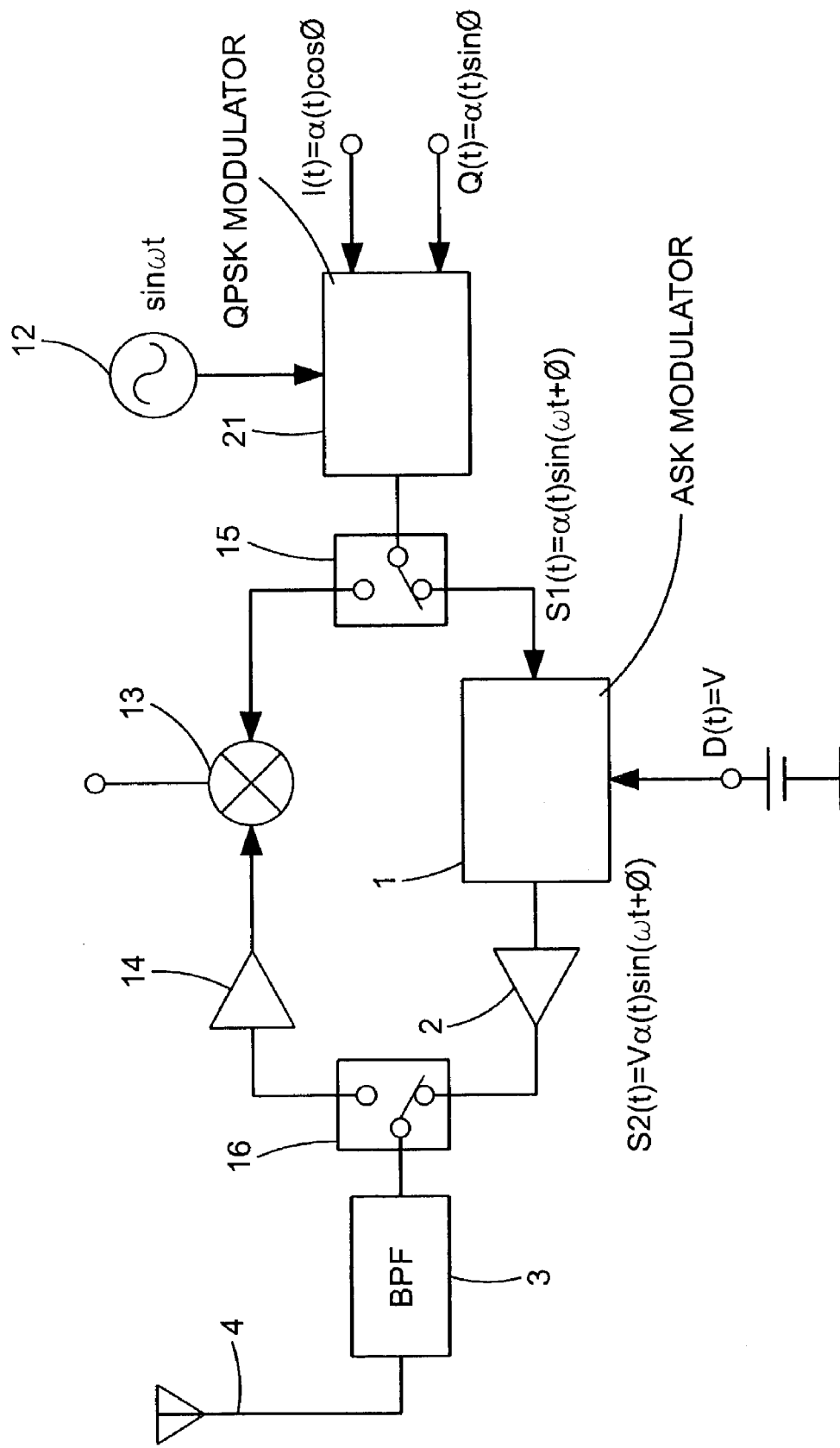
FIG. 6 is an overall block diagram of a wireless communication apparatus according to a second embodiment.

FIG. 6 shows a wireless communication apparatus according to a second embodiment. The second embodiment is characterized in that an ASK-modulated wave is output by a QPSK modulator. In the following description of the second embodiment, the same components as in the first embodiment are designated by the same characters, and descriptions thereof will be omitted.

Referring to FIG. 6, a QPSK modulator 21 is constructed similarly to the QPSK modulator 5 in the first embodiment. More specifically, the QPSK modulator 21 has a carrier wave input terminal, an I-signal input terminal, a Q-signal input terminal, and an output terminal (none of them shown). The output terminal of the QPSK modulator 21 is allowed to be selectively connected to the ASK modulator 1 or the mixer 13 by the switch 15.

The operation of the wireless communication apparatus according to the second embodiment will now be described. The operation is the same as in the first embodiment when outputting a QPSK-modulated wave at the time of a transmission and for reception, and thus descriptions of these cases will be omitted.

When outputting an ASK-modulated wave at the time of a transmission, similarly to the first embodiment, the switches 15 and 16 connect the QPSK modulator 21 to the ASK modulator 1 and also connect the ASK modulator 1 to the antenna 4.

In this state, a carrier wave (sin ωt) output from the high-frequency signal source 12 is input to the carrier wave input terminal of the QPSK modulator 21, and an I-signal I(t) and a Q-signal Q(t) expressed by equations (7) below are input respectively to the I-signal input terminal and the Q-signal input terminal. The phases of the I-signal I(t) and the Q-signal Q(t) are set to the same fixed value φ, for example, 45° (π/4 [rad]), and the amplitudes α(t) thereof change identically in time in accordance with ASK data signals ((α(t)∈{0, 1}).

$$I(t)=\alpha(t)\cos \phi$$

$$Q(t)=\alpha(t)\sin \phi \quad (7)$$

The QPSK modulator 21 mixes each of the I-signal I(t) and the Q-signal Q(t) with the carrier wave (sin ωt) from the high-frequency signal source 12 and adds the results, thereby outputting an output signal S1(t) expressed by equation (8) below. That is, the QPSK modulator 21 ASK-modulates the carrier wave based on the amplitude α(t), thereby outputting the output signal S1(t) in the form of an ASK-modulated wave (α(t)sin(ωt+φ))

$$\begin{aligned}S1(t) &= I(t)\sin\omega t + Q(t)\cos\omega t \\ &= \alpha(t)\cos\phi\sin\omega t + \alpha(t)\sin\phi\cos\omega t \\ &= \alpha(t)\sin(\omega t + \phi)\end{aligned} \quad (8)$$

At this time, a signal having a constant voltage V is input to the data input terminal of the ASK modulator 1 as a data signal D(t). Thus, the ASK modulator 1 amplifies the output signal S1(t) output from the QPSK modulator 21 by a constant gain. That is, the ASK modulator 1 amplifies the ASK-modulated wave (α(t)sin(ωt+φ)) to output an output signal S2(t) expressed by equation (9) below.

$$\begin{aligned}S2(t) &= D(t)S1(t) \\ &= V\alpha(t)\sin(\omega t + \phi)\end{aligned} \quad (9)$$

As described above, the second embodiment achieves the same operation and advantages as the first embodiment. Furthermore, according to the second embodiment, because an ASK-modulated wave is output using the QPSK modulator 21, an ASK-modulated wave can be output even if, for example, the data signal D(t) cannot be correctly modulated due to a malfunction in the ASK modulator 1.

Third Embodiment

Figure 7:
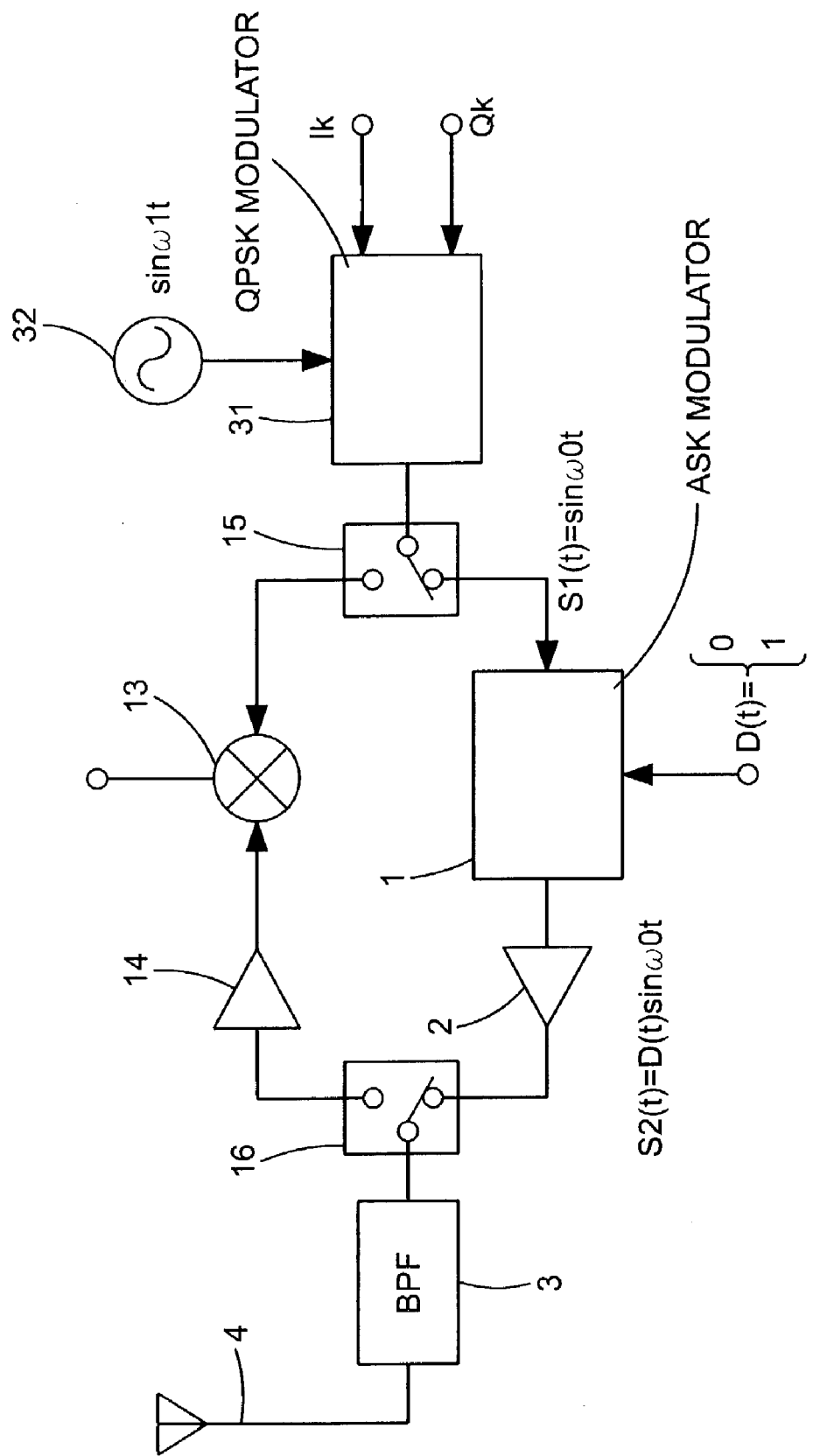
FIG. 7 is an overall block diagram of a wireless communication apparatus according to a third embodiment.

FIG. 7 shows a wireless communication apparatus according to a third embodiment. The third embodiment is characterized in that a QPSK modulator outputs a sine wave by a QPSK operation with a shift of π/4. In the following description of the third embodiment, the same components as in the first embodiment are designated by the same characters, and descriptions thereof will be omitted.

A QPSK modulator 31 is constructed similarly to the QPSK modulator 5 in the first embodiment. More specifically, the QPSK modulator 31 has a carrier wave input terminal, an I-signal input terminal, a Q-signal input terminal, and an output terminal (none of them shown). The output terminal of the QPSK modulator 31 is allowed to be selectively connected to the ASK modulator 1 or the mixer 13 by the switch 15.

A high-frequency signal source 32 is constructed similarly to the high-frequency signal source 12 in the first embodiment, and is connected to the carrier wave input terminal of the QPSK modulator 31. The oscillation frequency f1 of the high-frequency signal source 32 is set in advance to a value which is lower than a frequency f0 to be used for ASK modulation, the frequency of a carrier wave input to the modulator when a QPSK modulation without a π/4 shift is performed, or the frequency of a carrier wave input to the modulator when a quadrature modulation is performed, as expressed by equation (10) below:

$$f1=f0-(R/4) \quad (10)$$

where the unit of frequency is Hz.

R represent the transmission rate of QPSK data signals which are input to the QPSK modulator 31. Thus, the high-frequency signal source 32 outputs a sine wave (sin ω1t) corresponding to the frequency f1.

The operation of the wireless communication apparatus according to the third embodiment will now be described. The operation is the same as in the first embodiment when outputting a QPSK-modulated wave at the time of a transmission and for reception, and thus descriptions of these cases will be omitted.

When an ASK-modulated wave is output at the time of a transmission, similarly to the first embodiment, the switches 15 and 16 connect the QPSK modulator 31 to the ASK modulator 1 and also connect the ASK modulator 1 to the antenna 4.

In this state, a carrier wave (sin ω1t) output from the high-frequency signal source 32 is input to the carrier wave input terminal of the QPSK modulator 31, and an I-signal Ik and a Q signal Qk expressed by equations (11) below are input respectively to the I-signal input terminal and the Q-signal input terminal. The phase φ1 of the I-signal Ik and the Q-signal Qk is set, for example, to 45° (π/4 [rad]) correspondingly to the symbol "00" of a QPSK data signal. Ik-1 and Qk-1 represent an I-signal and a Q-signal one symbol time before, respectively.

$$Ik = Ik\text{-}1 \cos \phi1 - Qk\text{-}1 \sin \phi1$$

$$Qk = Ik\text{-}1 \sin \phi1 + Qk\text{-}1 \cos \phi1 \quad (11)$$

The QPSK modulator 31 mixes each of the I-signal Ik and the Q-signal Qk with the carrier wave (sin ω1t) from the high-frequency signal source 32 and adds the results. Thus, the QPSK modulator 31 performs a π/4 shift QPSK operation in which the phase is rotated by π/4 [rad] in each symbol time (two bits of QPSK data signal).

As a result, the QPSK modulator 31 outputs an output signal S1(t) in the form of a sine wave (sin ω0t), the frequency f0 thereof (f0=ω0/(2π)) being a value (f0=f1 +R/4) which is higher than the frequency f1 of the carrier wave (sin ω1t) output from the high-frequency signal source 32 by the transmission rate R/4·Hz of QPSK data signals. Thus, the QPSK modulator 31 outputs, as the output signal S1(t), a sine wave (sin ω0t) corresponding to the frequency f0 which is used for ASK modulation.

At this time, a discretized ASK data signal D(t)∈{0, 1} is input to the data input terminal of the ASK modulator 1 as a data signal D(t). Thus, the ASK modulator 1 ASK-modulates the output signal S1(t) in the form of the sine wave output from the QPSK modulator 31 using the data signal D(t), thereby outputting an output signal S2(t) in the form of an ASK-modulated wave (D(t)sin ω0t) expressed in equation (12) below:

$$S2(t) = D(t)S1(t) \quad (12)$$
$$= D(t)\sin\omega 0t$$

As described above, the third embodiment achieves the same operation and advantages as the first embodiment.

Furthermore, as described above, according to the third embodiment, a carrier wave having a frequency f1 which is lower than a predetermined frequency f0 to be used for ASK modulation by a transmission rate R/4·Hz is input to the QPSK modulator 31. Thus, even if the frequency f0 of an output signal S1(t) output from the QPSK modulator 31 is raised by the transmission rate R/4·Hz due to a π/4 shift QPSK operation, the QPSK modulator 31 outputs a sine wave having the predetermined frequency f0. Thus, the ASK modulator 1 ASK-modulates the sine wave having the frequency f0 using the data signal D(t), thereby outputting an ASK-modulated wave.

Although the operation in this embodiment is the same as in the first embodiment when outputting a QPSK-modulated wave at the time of a transmission and for reception, for example, when outputting a QPSK-modulated wave, the QPSK modulator 31 may perform a π/4 shift QPSK operation. Furthermore, at the time of a reception, the QPSK modulator 31 may output a sine wave by a π/4 shift QPSK operation, similarly to the case of outputting an ASK-modulated wave.

Fourth Embodiment

Figure 8:
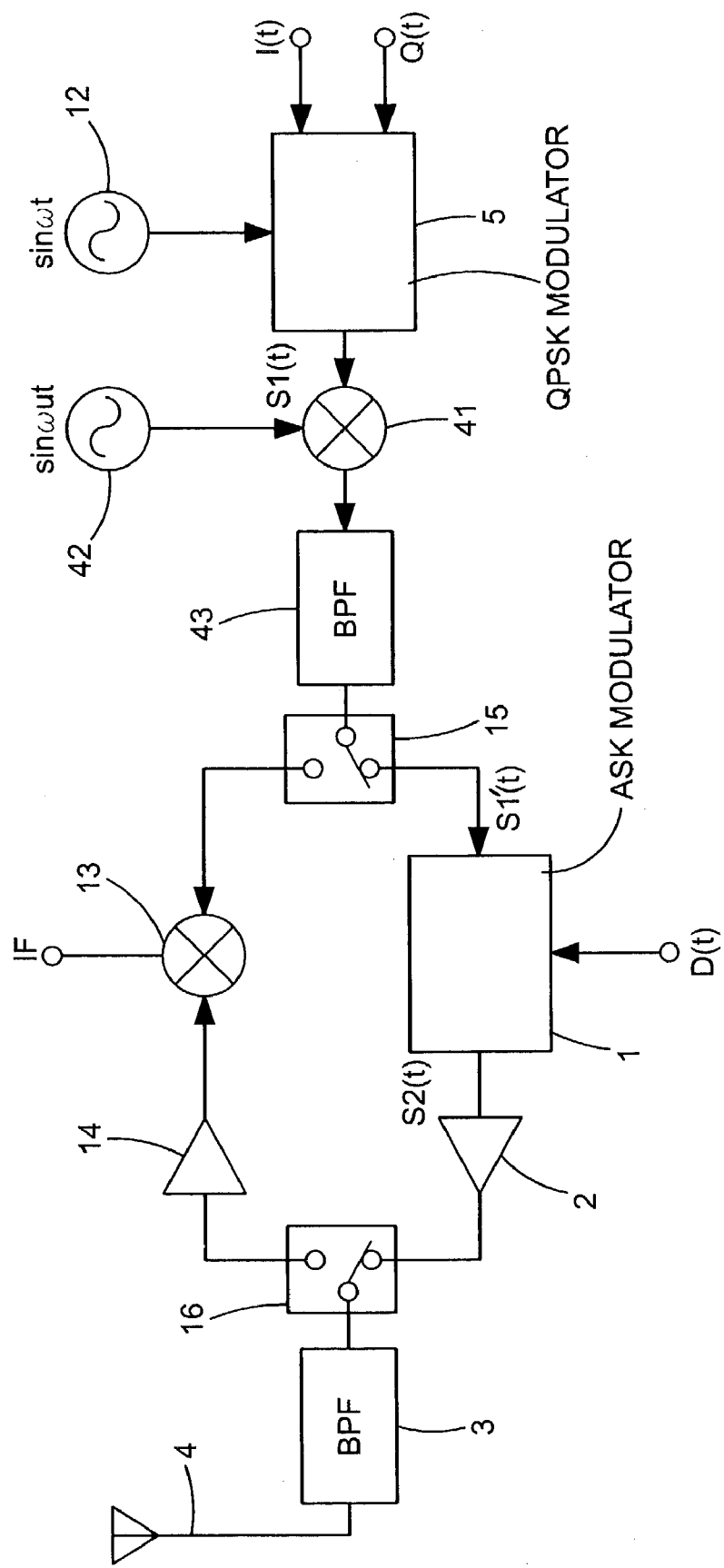
FIG. 8 is an overall block diagram of a wireless communication apparatus according to a fourth embodiment.

FIG. 8 shows a wireless communication apparatus according to a fourth embodiment. The fourth embodiment is characterized in that a mixer for raising frequency (hereinafter referred to as an up-mixer) is connected between an ASK modulator and a QPSK modulator. In the following description of the fourth embodiment, the same components as in the first embodiment are designated by the same characters, and descriptions thereof will be omitted.

Referring to FIG. 8, an up-mixer 41 is connected between the QPSK modulator 5 and the switch 15. One input terminal of the up-mixer is connected to the output terminal of the QPSK modulator 5, and the other input terminal of the up-mixer 41 is connected to a high-frequency signal source 42 for raising frequency. An output terminal of the up-mixer 41 is connected to the switch 15 via a bandpass filter 43.

In order to raise the frequency of an output signal S1(t) output from the QPSK modulator 5 by a predetermined frequency, the high-frequency signal source 42 outputs a sine wave (sin ωut) having a frequency in accordance with the frequency difference between a signal S1'(t) input to the ASK modulator 1, etc. and the output signal S1(t).

The frequency of the output signal S1(t) from the QPSK modulator 5 is raised by the up-mixer 41, etc., so that the signal S1'(t) with a frequency having been raised by the frequency of the sine wave (sin ωut) from the high-frequency signal source 42 can be selectively supplied to the ASK modulator 1 or the mixer 13.

As described above, the fourth embodiment achieves the same operation and advantages as the first embodiment. Furthermore, according to the fourth embodiment, because the up-mixer 41 for raising frequency is connected between the ASK modulator 1 and the QPSK modulator 5, even if, for example, the radio frequency is as high as 5 GHz or above, it suffices for the QPSK modulator 5 to output an output signal S1(t) with a frequency as low as 1 GHz or below. Thus, in contrast to a case where a high-frequency signal is output directly by the QPSK modulator 5, which requires use of an expensive material such as GaAs (gallium arsenide) for the QPSK modulator 5 and high-precision processes, according to the fourth embodiment, the QPSK modulator 5 can be implemented relatively easily using an inexpensive material such as silicon. Thus, the QPSK modulator 5 can be readily manufactured at a low cost.

Fifth Embodiment

Figure 9:
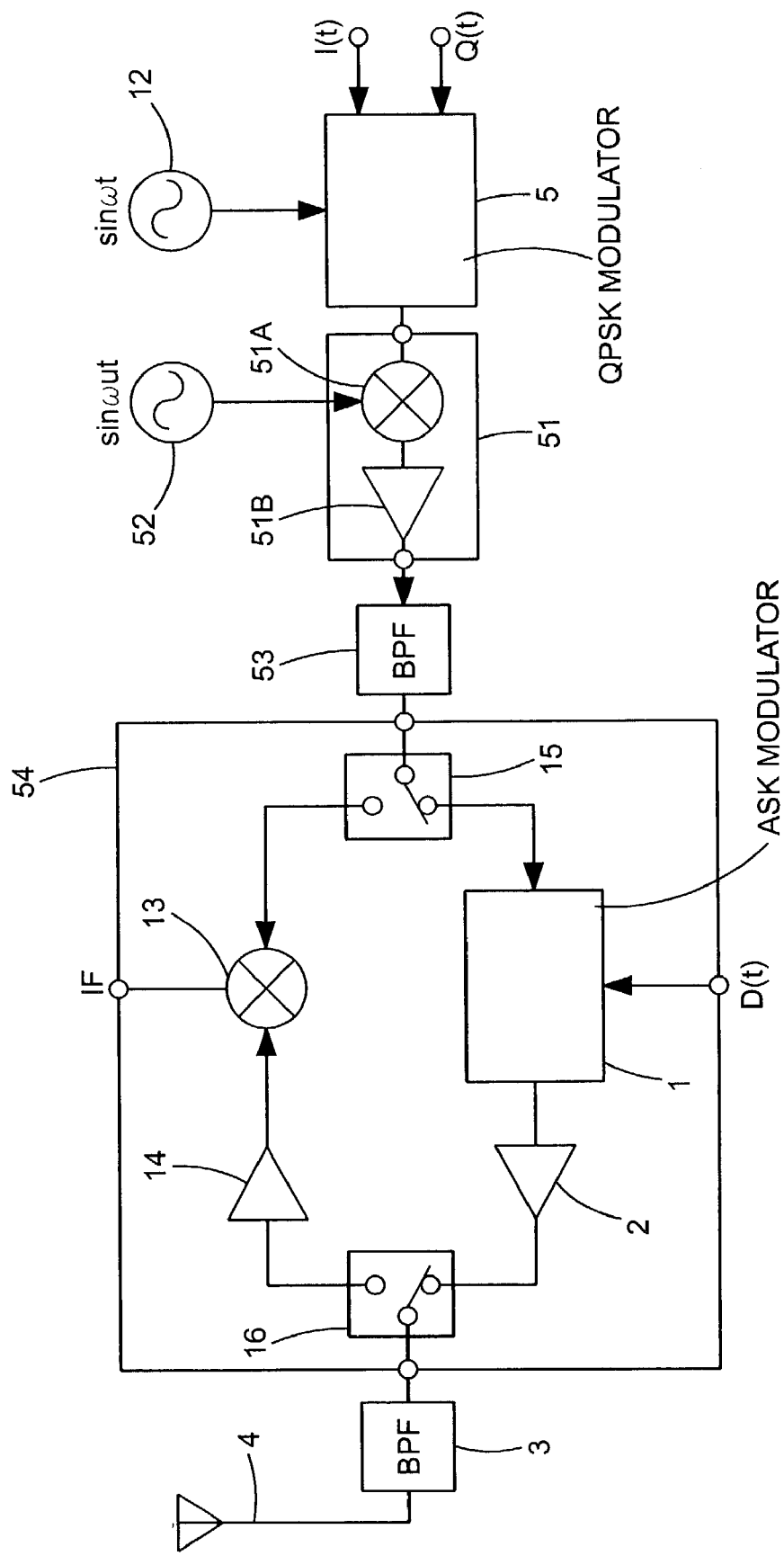
FIG. 9 is an overall block diagram of a wireless communication apparatus according to a fifth embodiment.

FIG. 9 shows a wireless communication apparatus according to a fifth embodiment. The fifth embodiment is characterized in that an ASK modulator, a mixer, etc. are integrally formed as an RF block. In the following description of the fifth embodiment, the same components as in the first embodiment are designated by the same characters, and descriptions thereof will be omitted.

Referring to FIG. 9, an up-mixer unit 51 is connected between the QPSK modulator 5 and the switch 15. The up-mixer unit 51 includes an up-mixer 51A and an amplifier 51B connected to the output of the up-mixer 51A. One input terminal of the up-mixer 51A is connected to the output terminal of the QPSK modulator 5, and the other input terminal of the up-mixer 51A is connected to a high-frequency signal source 52 for raising frequency. An output terminal of the up-mixer 51A is connected to the switch 15 via the amplifier 51B and a bandpass filter 53.

An RF block 54 integrates components which allow ASK modulation operation in the wireless communication apparatus, for example, in the form of an IC or an RF module component. The RF block 54 includes the ASK modulator 1, the mixer 13, the amplifiers 2 and 14, and the switches 15 and 16. A terminal of the RF block 54 associated with the switch 15 is connected to the QPSK modulator 5 via the bandpass filter 53, etc., and a terminal of the RF block 54 associated with the switch 16 is connected to the antenna 4 via the bandpass filter 3.

The wireless communication apparatus according to the fifth embodiment achieves the same operation and advantages as the first embodiment. Furthermore, according to the fifth embodiment, because the ASK modulator 1, the mixer 13, the switches 15 and 16, etc. are integrated as the RF block 54, the RF block 54 can be applied to a wireless communication apparatus according to the present invention, which is capable of both ASK modulation and QPSK modulation, and can also be applied to a wireless communication apparatus which requires only ASK modulation function. Thus, the RF block 54 can be manufactured in a large quantity, serving to reduce manufacturing cost.

Although the up-mixer unit 51 and the bandpass filter 53 are connected between the ASK modulator 1 and the QPSK modulator 5 in the fifth embodiment, the up-mixer unit 51 and the bandpass filter 53 may be omitted similarly to the first to the third embodiments.

Although the present invention has been described in relation to particular embodiments thereof, many other variations and modifications and other uses will become apparent to those skilled in the art. Therefore, the present invention is not limited by the specific disclosure herein.

As described hereinabove, a wireless communication apparatus according to the present invention can be manufactured at a low cost and is small in size, and thus can be suitably used in digital wireless communications.

What is claimed is:

1. A wireless communication apparatus comprising:
   an amplitude shift keying modulator (ASK modulator) for amplitude shift key-modulating (ASK-modulating) a carrier wave using a data signal; and
   a quadrature phase shift key modulator (QPSK modulator) for quadrature phase shift key-modulating (QPSK-modulating) a carrier wave using an in-phase signal (I-signal) and a quadrature signal (Q-signal);
   wherein an output terminal of said QPSK modulator is connected to an input terminal for said carrier wave of said ASK modulator.

2. A wireless communication apparatus comprising:
   an amplitude shift keying modulator (ASK modulator) for amplitude shift key-modulating (ASK-modulating) a carrier wave using a data signal; and
   a quadrature phase shift key modulator (QPSK modulator) for quadrature phase shift key-modulating (QPSK-modulating) a carrier wave using an in-phase signal (I-signal) and a quadrature signal (Q-signal), wherein an output terminal of said QPSK modulator is connected to an input terminal for said carrier wave of said ASK modulator;
   a mixer; and
   a switch provided between said QPSK modulator and each of said mixer and said ASK modulator, said switch connecting said ASK modulator and said QPSK modulator at the time of a transmission, and connecting said mixer and said QPSK modulator at the time of a reception;
   wherein said QPSK modulator outputs a sine wave as a carrier wave to said mixer at the time of a reception.

3. A wireless communication apparatus according to claim 1,
   wherein when the wireless communication apparatus outputs a QPSK-modulated wave at the time of a transmission, said QPSK modulator QPSK-modulates a carrier wave using an I-signal and a Q-signal to output the QPSK-modulated wave, and said ASK modulator amplifies the QPSK-modulated wave by a constant gain, and
   when the wireless communication apparatus outputs an ASK-modulated wave at the time of a transmission, said QPSK modulator outputs a sine wave, and said ASK modulator ASK-modulates the sine wave using a data signal.

4. A wireless communication apparatus according to claim 3,
   wherein when the wireless communication apparatus outputs the QPSK-modulated wave at the time of a transmission, said QPSK modulator receives input of data signals respectively as an I-signal and a Q-signal and outputs the QPSK-modulated wave, and said ASK modulator receives input of a signal having a constant voltage as a data signal and amplifies the QPSK-modulated wave by a constant gain.

5. A wireless communication apparatus according to claim 3,
   wherein when the wireless communication apparatus outputs the ASK-modulated wave at the time of a transmission, said QPSK modulator receives input of signals having the same fixed phases and fixed amplitudes respectively as an I-signal and a Q-signal and outputs a sine wave, and said ASK modulator receives input of a data signal and ASK-modulates the sine wave to output the ASK-modulated wave.

6. A wireless communication apparatus according to claim 3,
   wherein when the wireless communication apparatus outputs the ASK-modulated wave at the time of a transmission, said QPSK modulator receives input of signals based on a QPSK data signal "00" as an I-signal and a Q-signal and performs a $\pi/4$ shift QPSK operation to output a sine wave, and said ASK modulator receives input of a data signal and ASK-modulates the sine wave to output the ASK-modulated wave.

7. A wireless communication apparatus according to claim 6,
   wherein said QPSK modulator receives input of a carrier wave having a frequency which is lower than a predetermined frequency by $R/4 \cdot Hz$ and performs a $\pi/4$ shift QPSK operation to output a sine wave having the predetermined frequency, wherein R is a transmission rate of the QPSK data signal.

8. A wireless communication apparatus according to claim 1,
wherein when the wireless communication apparatus outputs a QPSK-modulated wave at the time of a transmission, said QPSK modulator QPSK-modulates a carrier wave using an I-signal and a Q-signal to output the QPSK-modulated wave, and said ASK modulator amplifies the QPSK-modulated wave by a constant gain, and
wherein when the wireless communication apparatus outputs an ASK-modulated wave at the time of a transmission, said QPSK modulator receives input of data signals having the same fixed phases and amplitudes thereof changing identically in time respectively as an I-signal and a Q-signal and outputs the ASK-modulated wave, and said ASK modulator receives input of a signal having a constant voltage as a data signal and amplifies the ASK-modulated wave by a constant gain.

9. A wireless communication apparatus according to claim 1, further comprising an up-mixer for raising frequency, connected between said ASK modulator and said QPSK modulator.

10. A wireless communication apparatus according to claim 2,
wherein said ASK modulator, said mixer, and said switch are integrated as an RF block.

11. A wireless communication apparatus according to claim 2,
wherein when the wireless communication apparatus outputs a QPSK-modulated wave at the time of a transmission, said QPSK modulator QPSK-modulates a carrier wave using an I-signal and a Q-signal to output the QPSK-modulated wave, and said ASK modulator amplifies the QPSK-modulated wave by a constant gain, and
when the wireless communication apparatus outputs an ASK-modulated wave at the time of a transmission, said QPSK modulator outputs a sine wave, and said ASK modulator ASK-modulates the sine wave using a data signal.

12. A wireless communication apparatus according to claim 4,
wherein when the wireless communication apparatus outputs the ASK-modulated wave at the time of a transmission, said QPSK modulator receives input of signals having the same fixed phases and fixed amplitudes respectively as an I-signal and a Q-signal and outputs a sine wave, and said ASK modulator receives input of a data signal and ASK-modulates the sine wave to output the ASK-modulated wave.

13. A wireless communication apparatus according to claim 4,
wherein when the wireless communication apparatus outputs the ASK-modulated wave at the time of a transmission, said QPSK modulator receives input of signals based on a QPSK data signal "00" as an I-signal and a Q-signal and performs a $\pi/4$ shift QPSK operation to output a sine wave, and said ASK modulator receives input of a data signal and ASK-modulates the sine wave to output the ASK-modulated wave.

14. A wireless communication apparatus according to claim 2,
wherein when the wireless communication apparatus outputs a QPSK-modulated wave at the time of a transmission, said QPSK modulator QPSK-modulates a carrier wave using an I-signal and a Q-signal to output the QPSK-modulated wave, and said ASK modulator amplifies the QPSK-modulated wave by a constant gain, and
when the wireless communication apparatus outputs an ASK-modulated wave at the time of a transmission, said QPSK modulator receives input of data signals having the same fixed phases and amplitudes thereof changing identically in time respectively as an I-signal and a Q-signal and outputs the ASK-modulated wave, and said ASK modulator receives input of a signal having a constant voltage as a data signal and amplifies the ASK-modulated wave by a constant gain.

* * * * *